Figure 1:
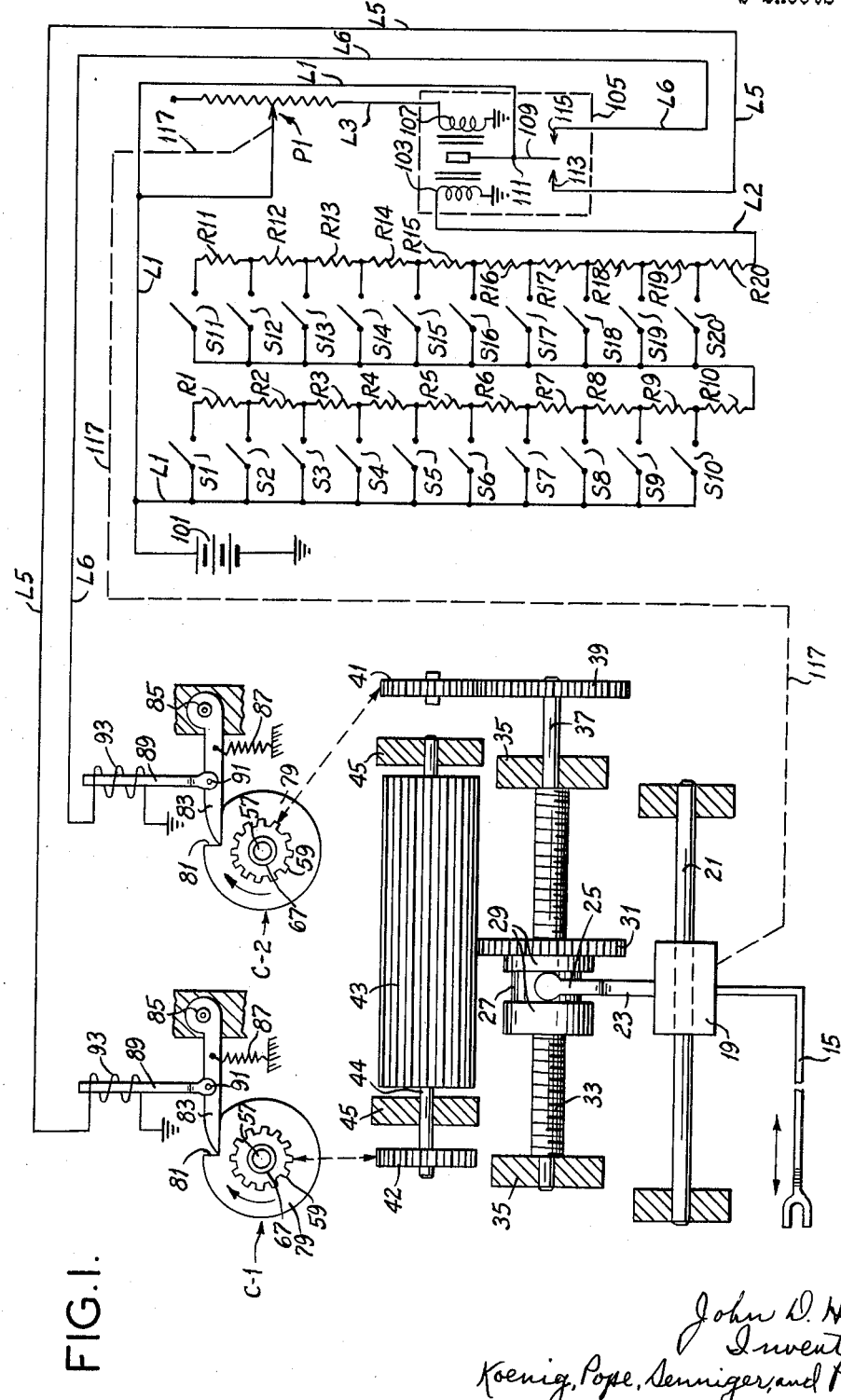

May 3, 1966 — J. D. HELMS — 3,249,191
CLUTCH POSITIONING APPARATUS
Filed Aug. 14, 1963 — 2 Sheets-Sheet 1

John D. Helms, Inventor.
Koenig, Pope, Senniger, and Powers, Attorneys.

May 3, 1966  J. D. HELMS  3,249,191
CLUTCH POSITIONING APPARATUS
Filed Aug. 14, 1963  2 Sheets-Sheet 2
FIG. 2.
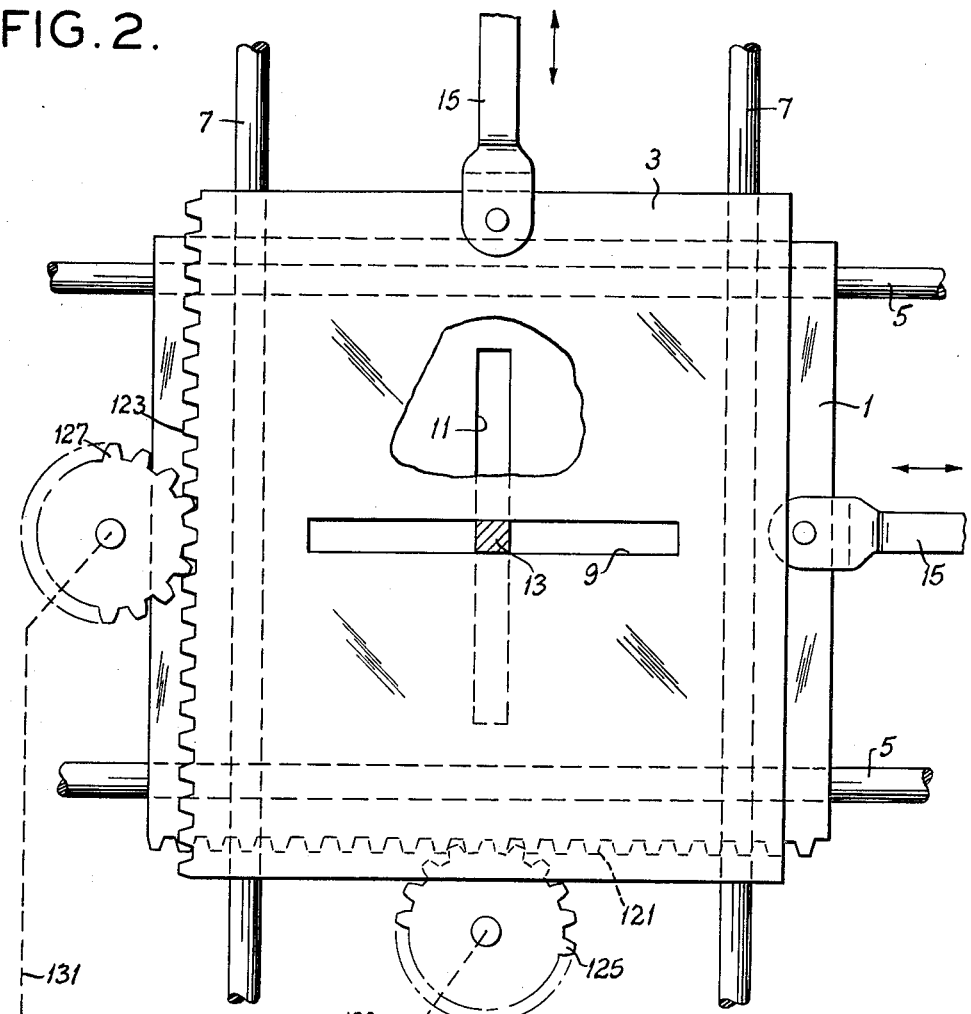
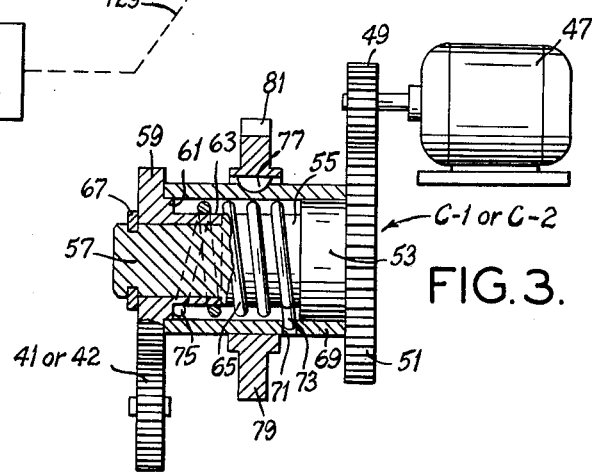
FIG. 3.

United States Patent Office 3,249,191
Patented May 3, 1966

3,249,191
CLUTCH POSITIONING APPARATUS
John D. Helms, Dallas, Tex., assignor to Texas Instruments Incorporated, Dallas, Tex., a corporation of Delaware
Filed Aug. 14, 1963, Ser. No. 302,194
7 Claims. (Cl. 192—142)

This invention relates to positioning apparatus for moving a member by steps or increments to selected stations, and with regard to certain more specific features, to apparatus of this class wherein the positions of a plurality of such members control the position of another member along rectangular coordinates to selected work stations.

Among the several objects of the invention may be noted the provision of electromechanical apparatus for positioning a movable member by electrically programmed increments, determinations of the magnitudes of individual increments being accurately made and positively maintained by mechanical means so that the design of the electrical components may be simplified; the provision of apparatus of the class described wherein each member being moved is positively locked against movement at any programmed station or position of rest; the provision of apparatus of this class which has no overshooting and undershooting characteristics which might otherwise be required to be damped out by the use of more complex circuitry; and the provision of apparatus of this class which is simple to construct, both mechanically and electrically, and which is positive and reliable in operation. Other objects and features will be in part apparent and in part pointed out hereinafter.

The invention accordingly comprises the mechanical and electrical elements and combinations of such elements, features of construction, and arrangements of parts and circuits which will be exemplified in the constructions hereinafter described, and the scope of which will be indicated in the following claims.

In the accompanying drawings, in which one of various possible embodiments of the invention is illustrated, FIGURE 1 is a diagrammatic view of an electromechanical system for carrying out the invention in connection with the movement of one slide member along one coordinate;

FIGURE 2 is a diagrammatic plan view, parts being broken away, illustrating typical first and second slider members movable along rectangular coordinates and adapted to drive a third member by increments along said coordinates, each of said first and second members being adapted to be driven by a system according to FIGURE 1; and FIGURE 3 is a diagrammatic axial section (partially in elevation) illustrating one of a pair of typical indexing clutches such as shown in FIGURE 1.

Corresponding reference characters indicate corresponding parts throughout the several views of the drawings.

A typical example of the use of the present invention is to provide coordinate stepped movements in a plane of a work table or the like, such that an object carried thereby may be accurately moved into and positively held in a succession of positions for operations to be performed thereon. This may require movement along either or both of two coordinates, said coordinates being mutually perpendicular when two are employed. In order that increments of movement along either or both axes may be determined in magnitude, electrical means have been heretofore proposed, but these have the disadvantage of not employing simple and positive means to lock the work table in its work stations, and the requirement of complex circuitry for damping out overshooting and undershooting. According to the present invention, electrical circuitry is made simple by limiting its functions to sequencing operations, leaving any required accurate positioning and locking functions to the mechanical parts of the system.

Referring first to the left-hand side of FIGURE 1, and to FIGURES 2 and 3, which schematically illustrate mechanical components, there are shown at numerals 1 and 3 (FIGURE 2) two sliders movably carried on pairs of guides 5 and 7, respectively. Each slider and its respective guides lie in different planes, so that the sliders are independently movable along mutually perpendicular coordinates. The sliders 1 and 3 contain right-angularly related driving slots 9 and 11, respectively. A table-supporting member which is to be moved along either or both axes is shown at 13. The member 13 extends through both slots 9 and 11 and intersects both sliders 9 and 11. It is suitably mounted by conventional means (not shown) so that it may be moved parallel to the plane of the paper by transverse movements of either or both sliders 1 and 3. Member 13, for example, carries a work table which it is desired to move accurately in any of various stations in a plane. The table is not shown, being any suitable one adapted to form a convenient work support. At numerals 15 are shown two linearly movable drivers pinned to the sliders 1 and 3, respectively. Each of these linear drivers 15 is adapted to be driven by an electromechanical system such as illustrated in FIGURE 1.

Each driver 15, which is a reversely movable device, forms a rigid extension from a sliding member such as shown at 19 in FIGURE 1. The latter has reciprocating movement on a guide 21 and and has a forked extension 23. The fork 25 of the extension 23 is located in a groove 27 of an interiorly threaded nut or hub 29 forming part of a gear 31. The interior of the hub 29 has threading engagement with a screw 33, the latter being rotatable in bearing blocks 35. The screw has a shaft extension 37 carrying a gear 39 which, for example, is meshed with a driving gear 41.

The gear 31 is meshed with a wide-faced gear 43, the arrangement being such that the mesh between gears 31 and 43 may be maintained in any axial position of the gear 31 on screw 33. The gear 43 is carried in bearing blocks 45 and has a shaft 44 which for example carries a gear 42. It will be apparent that, if gear 43 remains stationary, so will gear 31, and then if the screw 33 is driven to rotate, the hub will be driven axially on the screw. The hub carries with it the linearly moving parts 25, 23, 19 and 15. It is by such a system that each of the drivers 15 (FIGURE 2) may be moved on a coordinate, thus carrying along slider 1 or 3, as the case may be.

The hub 29 may also be moved axially in the reverse direction along screw 33 by holding the screw stationary and rotating the hub in the same clock direction as the screw 33 rotated before it stopped. Thus when the gear 31 does not rotate and the screw 33 turns in a given direction, the axial motion of the hub 29 is in one direction, say to the right, and when screw 33 stops and gear 31 rotates in the same direction as did the screw, then the axial motion of the hub 29 takes place in the opposite direction, say to the left. Therefore each of sliders 1 and 3 may be moved back and forth by controlling the rotations and stoppages of its respective screw 33 and gear 31. Each driver 15 is under linear control of the hub 29 and through the hub has connected therewith a pair of drive means, one drive means terminating with screw 33 and the other with the gear 31. These drive means are further described below.

Individual on-off control clutches C–1 and C–2 are shown diagrammatically at the upper left of FIGURE 1 and a section of one of them is shown schematically in FIGURE 3. Since both of these clutches C-1 and C-2 are constructed alike, their parts are numbered the same and a description of one will suffice as a description for both. Each clutch is driven through suitable speed-reduction gearing by a constantly rotating motor or prime mover such as shown at 47. Such gearing is schematically illustrated by gears 49 and 51. The particular gearing to be used depends upon the speeds of motors 47 and the speed of indexing required. Therefore other numbers or types of gears may be used in the speed in obtaining the desired speed reduction, as required. Gear member 51, which drives the clutch, has a three-step hub, the steps being numbered 53, 55 and 57. A clutch-driven gear 59 meshes either with gear 42 or gear 41, as the case may be. It has a double-stepped hub, one step of which is shown at 61 and the other at 63. The gear 59 and its double-stepped hub 61, 63 are bored to receive the inner step 57 of the three-stepped hub of gear 51. The outside diameters of the hub steps 63 and 55 are the same, thus providing cylindrical driving and driven forms about which a drive spring 65 is wrapped for frictional engagement with both. A snap ring 67 maintains the axial assembly of the hubs.

Rotatably carried on the hub steps 61 and 53 is a sleeve 69 in which is a recess 71 forming a connection with one end 73 of the spring 65. The other end 75 of the spring 65 is free. Keyed as at 77 to the sleeve 69 is a disc 79, notched as shown at 81. Cooperating with the disc 79 and at intervals with the notch 81 is a pawl 83, pivoted at 85. The pawl is movable toward the disc 79 by action of a spring 87, or removable therefrom by action of an electromagnetic core 89 pivoted at 91. The core 89 forms part of a solenoid, the coils of which are shown at 93. When the coil 93 is energized, the core 89 is pulled up, thus removing the pawl 83 from the disc 79. When the coil 93 is deenergized, the spring 97 pulls the pawl against the disc 79. As will appear, any rotation of the mechanical drive which the clutch serves is stopped when the notch 81 reaches the pawl 83.

If the disc 79 is permitted to rotate (pawl 83 up), then so is the sleeve 69 and the connected end 73 of the spring 65. The spring adjacent its end 73 tends to hug step 75 with friction. Thus when gear 51 turns, the spring 65 winds tightly about both the steps 55 and 63, to form a driving connection between them and between the continuously rotating clutch input gear 51 and the output gear 59. On the other hand, if the rotation of the disc 79 is prevented, as by engagement of its notch with the pawl 83, the end 73 of spring 65 cannot be wound up on steps 55 and 63 and consequently its frictional clutching action ceases. In other words, the clutch then releases or opens. Contact of pawl 83 when it drops in accordance with an electrical signal, to be described, may occur anywhere on the rim of the disc 79. This signal response in and of itself does not cause clutch release because the end 73 of spring 65, while driving, carries around the freely movable sleeve 69. But when notch 81 reaches pawl 83, the end 73 of spring 65 is stopped so that step 55 loses its frictional driving effect on the spring. In other words, the clutch is released or opened precisely at the time that the notch 81 engages the pawl 83. At that time rotation of clutch output gear 59 stops along with its driving train to driver 15, while motor 47 and gears 49 and 51 continue to rotate. Depending upon which clutch C-1 or C-2 is being considered, the stated driving train may be (42, 43, 31, 29, 23, 19) or (41, 39, 33, 29, 23, 19). These trains have a common portion (29, 23 and 19). When the pawl 83 is removed from the notch 81, the disc 79 is again free, whereupon the frictional driving connection is again effected.

The electrical control portion of the FIGURE 1 system which provides for the selective energization of coils 93 is illustrated as comprising two variable resistances, the first consisting of twenty series-connected resistors R1–R20 and the second consisting of a potentiometer P1. Resistors R1–R20 are selectively connected by respective programming switches S1–S20 to a conductor L1 which is in turn connnected to the positive terminal of a suitable D.C. power supply, illustrated as a battery 101. The negative terminal of battery 101 is connected to ground as indicated. It is preferred that each of resistors R1–R-10 has a first value (for example, .250 ohm) while each of resistors R11–R20 has a value one-tenth as large (for example, .025 ohm). This permits the resistance between line L1 and a conductor L2 (connected to resistor R20) to be varied by a selective actuation of switches S1–S20 from a minimum value of .275 ohm (when switches S10 and S20 are closed) to a maximum value of 2.750 ohms (when switches S1 and S11 are closed) the variation occurring in steps or increments of .025 ohm.

Conductor L2 is connected to one coil or winding 103 of a differenial control relay 105. The other coil of this relay, indicated at 107, is connected by a conductor L3 to the resistance element of potentiometer P1. Relay 105 has a movable arm or contact 109 pivoted at point 111 and movable between two poles 113 and 115. Arm 109 is connected by conductor L with the positive terminal of power supply 101. Each of coils 103 and 107 is connected to ground as indicated. The differential relay has three states or modes of operation: (1) wherein the current through coil 103 exceeds the current through coil 107; (2) wherein the current through coil 107 exceeds that through coil 103; and (3) wherein the currents through the two coils are equal. In state (1), arm 109 connects pole 115 with line L1; in state (2), arm 109 connects pole 113 with this conductor; and in mode (3), arm 109 occupies a position midway between poles 113 and 115, neither being connected by line L1 with the terminal of supply 101.

Pole 113 is interconnected by a conductor L5 to coil 93 of clutch C-1, and pole 115 is connected by a conductor L6 with the coil 93 of clutch C-2. Each of coils 93 is connected to ground, so that the position of movable arm 109 controls which, if any, of these coils 93 is energized. It will be appreciated that the energization of these coils is mutually exclusive; i.e., while there are conditions under which neither coil is energized (when the amount of current through coil 103 equals that through coil 107), energization of one coil precludes energization of the other.

The movable arm of potentiometer P1 is connected to conductor L1, and this arm is positioned in accordance with or as a function of the position of sliding member 19. A mechanical linkage between this member and the arm of potentiometer P1 is indicated schematically by the dotted line 117. This arrangement is such that the resistance presented by this potentiometer between line L1 and coil 107, and hence the current through this coil, is proportional to or an analog of the position of sliding member 19. On the other hand, the resistance presented by resistors R1–R20 between line L1 and coil 103, and hence the current through this coil, by selective programming of switches S1–S20 is made proportional to or an analog of the desired or preestablished position which member 19 should assume.

Operation of the system of FIGURE 1 is as follows, it being understood that this system provides for the movement of the table-supporting member 13 along one coordinate only, and that two control systems such as illustrated in FIGURE 1 are required to provide two coordinate or X-Y movements of this member 13.

The desired or preselected position or station of sliding member 19 is set into the control by the proper programming of switches S1–S20, which determines the resistance between line L1 and coil 103. If the position of the member 19 does not correspond to this preselected position, the resistance between line L1 and coil 107 differs from the resistance between the former and coil 103. This causes an unbalance in the differential relay, causing in turn selective energization of clutch C-1 or C-2, whichever action tends to bring the member 19 to its proper station along its coordinate axis.

For example, if the member is to the right of its preselected station, the resistance presented by potentiometer P1 will be less than the resistance set in by resistors R1-R20. Under these conditions, the current through coil 107 exceeds that through coil 103, and contact 109 is actuated to the left to interconnect conductors L1 and L5 and thereby energize coil 93 of clutch C-1. This draws the pawl 83 of C-1 out of notch 81, closing this clutch and rotating hub 29. As explained above, this moves the hub 29 to the left (screw 33 stationary and gear 43 turning) toward the selected station. The resulting movement of sliding member 19 causes a concurrent increase in the resistance presented by potentiometer P1 between line L1 and coil 107, thereby decreasing the current through the coil. Coil 93 of clutch C-1 remains energized until the resistance of P1 equals that switched in by switches S1-S20. At this point, the current through coil 107 equals that through coil 103 and arm 109 is actuated to a balanced or neutral position midway between poles 113 and 115. This deenergizes coil 93 of clutch C-1, allowing pawl 83 to drop on its disc 79. Thereafter the clutch C-1 remains closed (and member 19 continues to move to the left) until pawl 83 engages notch 81 and opens the clutch. When this occurs, the member 19 is immediately stopped and locked in the desired position. It will be observed that regardless of when coil 93 is deenergized, dropping pawl 83 on disc 79, the driving action of hub 29 continues until notch 81 is brought into engagement with the pawl 83. Thus, it is the mechanical portion of the system, or more specifically, the operation of clutch C-1, which determines the exact positioning of member 19 and its connected parts. This permits the use of a simplified electrical control, while insuring an exact positioning of the movable member.

If, instead of being to the right of its preselected station, member 19 is to the left thereof, a sequence of steps similar to that outlined above takes place, but under these circumstances the coil 93 of clutch C-2 is energized by the differential relay 105 until the member is moved (by rotation of screw 33) to this desired station or position. Again, deenergization of coil 93 of clutch C-2 does not, as such, cause the clutch to open; instead, the clutch remains closed after deenergization of coil 93 until pawl 83 engages notch 81. This, again, insures exact incremental positioning of member 19 and its associated parts along the coordinate axis.

It will be apparent that when either clutch C-1 or clutch C-2 is opened (i.e., when gear 43 or screw 33 stops) overrunning action of member 15 cannot occur because the hub 29 cannot move linearly on screw 33 unless one or the other is rotating. Such rotation ceases practically at the instant that contact occurs between notch 81 and pawl 83 in view of the comparatively low inertia of the various parts, and in view of the usual bearing friction of the operating parts.

Various drive connections other than those shown may be used between either gear 59 and the parts 43 or 33 to be driven thereby. Selections in this regard are determined by various considerations such as locations of clutches C-1 and C-2 relative to shafts 44 and 37, and by the speed reductions required in view of the speeds of motor 47. For motors or other prime movers such as 47 turning at the same speeds, the speed ratios between their respective clutches C-1 and C-2 and the hub 29 should be the same so that incremental movements of the driver 15 are the same for both forward and reverse movements.

It should be noted that while a differential relay 105 is specifically illustrated in FIGURE 1, other known components could be employed to control the selective energization of coils 93 of clutches C-1 and C-2. For example, a differential amplifier having one input connected with resistor R20 and a second input connected to potentiometer P1 could be used in some applications to provide this selective energization. It will be understood that because the clutches C-1 and C-2 in themselves prevent overshooting or undershooting of the movable member, and because the incremental positions are determined mechanically, the time constant or response time of the electrical control is not critical. This allows for greater freedom in the selection of the particular control devices to be employed in any specific application than would otherwise be the case.

To provide a record of the stations or coordinates wherein the member is positioned, each of the slide members 1 and 3 is provided with a rack, indicated at 121 and 123, respectively. These rotate or position respective pinions 125 and 127. The latter are connected by suitable drives 129 and 131 to the inputs of a conventional digital encoder 133. This encoder provides a history or record, for example on magnetic tape, of the coordinate stops made by member 13 during selective programming of switches S1-S20. Regarding these switches, it will be understood that the various stations to which member 13 is to be moved may be set in manually during an operation by selective closing of these switches. If the FIGURE 1 system is to be employed in automatic equipment, these switches may be automatically actuated, for example, by stepping switches or the like, during a cycle of operation of the equipment.

In view of the above, it will be seen that the several objects of the invention are achieved and other advantageous results attained.

As various changes could be made in the above constructions and circuits without departing from the scope of the invention, it is intended that all matter contained in the above description or shown in the accompanying drawings shall be interpreted as illustrative and not in a limiting sense.

What is claimed is:

1. Positioning apparatus comprising a driven member to be moved by increments to selected stations, first and second continuously operative driving members, means including first and second clutches for selectively coupling said driven member to said first and second driving members respectively, said first driving member when coupled to said driven member moving the latter in one direction, and said second driving member when coupled to said driven member moving the latter in a reverse direction, first and second mechanical clutch-control means for said first and second clutches respectively, each of said mechanical clutch-control means having a first position wherein its respective clutch closes and couples said driven member with a driving member and a second position wherein its respective clutch opens to decouple said member, each of said clutches including mechanical means to effect said decoupling only in selected incremental positions of said driven member, and electrical control means including programmable sequencing means for operating said mechanical clutch-control means to their first and second positions in desired sequences.

2. A system as set forth in claim 1, wherein said electrical control means comprises a first variable resistance for obtaining resistance values proportioned in accordance with the incremental positions of said selected stations, a second variable resistance operatively connected with said driven member and having a value which varies as a function of the actual position of said driven member, and a differential control device interconnected with said resistances for selectively actuating said first mechanical clutch-control means to move said driven member in said one direction when the value of one of said resistances exceeds that of the other, and for selectively actuating said second mechanical clutch-control means to move said driven member in the reverse direction when the value of said one resistance is less than the other.

3. A system as set forth in claim 2, wherein said first variable resistance includes a plurality of series-connected resistors selectively interconnected by a plurality of programming switches between an electrical power supply and said differential control device, whereby the programming of said switches determines the positions of said stations.

4. A system as set forth in claim 1, wherein said driven member is coupled to a hub having threading engagement with a screw, and wherein said first driving member when coupled to said driven member rotates said hub to move the latter along said screw in one direction, and said second driving member when coupled to said driven member rotates said screw to move said hub along said screw in a reverse direction.

5. Apparatus for successively positioning a movable part at selected work stations along two coordinate axes, comprising first and second driven members coupled to said movable part for moving it to work stations along the axes respectively, first and second mechanical systems for moving said driven members along said axes, first and second driving members for each mechanical system, each system including first and second clutches for selectively coupling its driving members to the driven member of the respective system, the first driving member in each system when coupled to its driven member moving the latter in one direction, the second driving member in each system when coupled to its driven member moving the latter in a reverse direction, first and second clutch-operating means in each system for the two clutches therein respectively, each clutch-operating means in a system having a first state wherein its respective clutch couples a driving member of the system with the driven member therein, and a second state for decoupling them, delayed-action decoupling means associated with each clutch-operating means in each system to effect clutch decoupling only in selected incremental positions of its driven member, and electrical control means for each system including means to actuate one of the clutch-operating means therein to its first state to close its clutch for moving the respective driven member, and thereafter to actuate the same clutch-operating means to its second state when the second driven member is within an incremental distance from a selected station, thereby preparing for the opening of the same clutch by action by said decoupling means.

6. Apparatus made according to claim 5 wherein each electrical control means comprises a first variable resistance, a second variable resistance, means responsive to the movement of the controlled driven member for changing the value of the second variable resistance in accordance with movement of the controlled driven member, and a differential control interconnected with said resistances for selectively actuating one or the other of said clutch-operating means for moving the driving member in one direction when the value of one resistance exceeds that of the other, and in the reverse direction when the value of said one resistance is less than the other.

7. Apparatus made according to claim 6 wherein said first variable resistance includes a plurality of series-connected resistances selectively interconnected by a plurality of programming switches between an electrical power supply and said differential control.

References Cited by the Examiner

UNITED STATES PATENTS

| | | | |
|---|---|---|---|
| 2,227,114 | 12/1940 | Tear | 192—141 |
| 2,889,508 | 6/1959 | McCoy et al. | 192—143 X |
| 3,021,512 | 2/1962 | Welsh et al. | 192—143 X |
| 3,064,168 | 11/1962 | Dosch. | |

DAVID J. WILLIAMOWSKY, *Primary Examiner.*

DON A. WAITE, *Examiner.*

B. W. WYCHE III, *Assistant Examiner.*